Oct. 16, 1934.    L. A. SHORT    1,976,751
MEAT TENDERER
Filed Dec. 16, 1932    4 Sheets-Sheet 1

INVENTOR
Lillie A. Short
BY Pohh & Powers
ATTORNEYS

Oct. 16, 1934.                L. A. SHORT                1,976,751
                              MEAT TENDERER
                        Filed Dec. 16, 1932         4 Sheets-Sheet 2
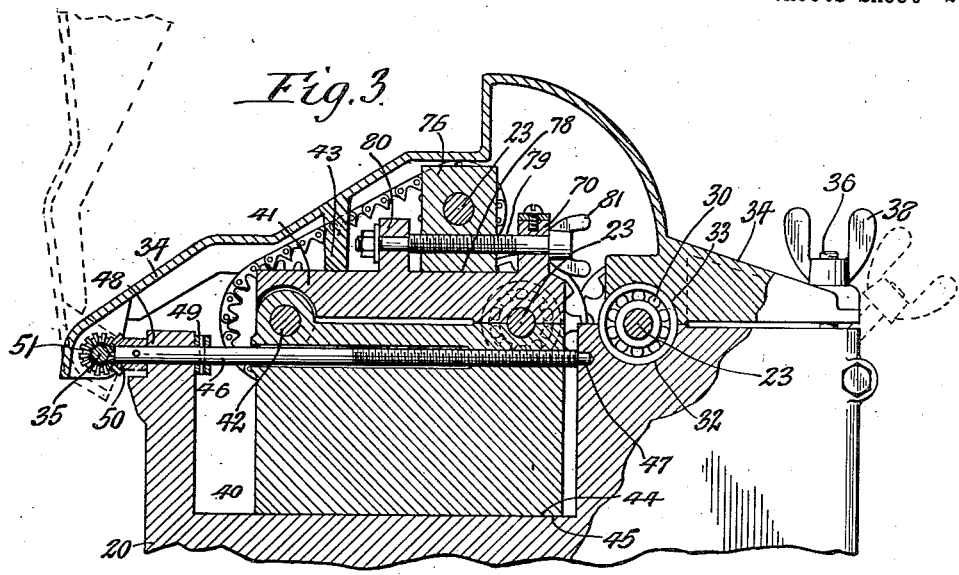
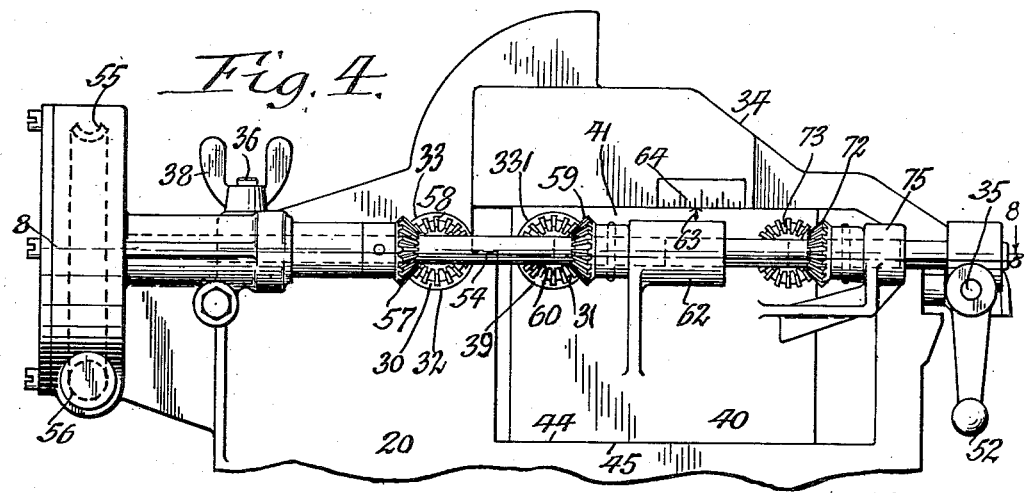
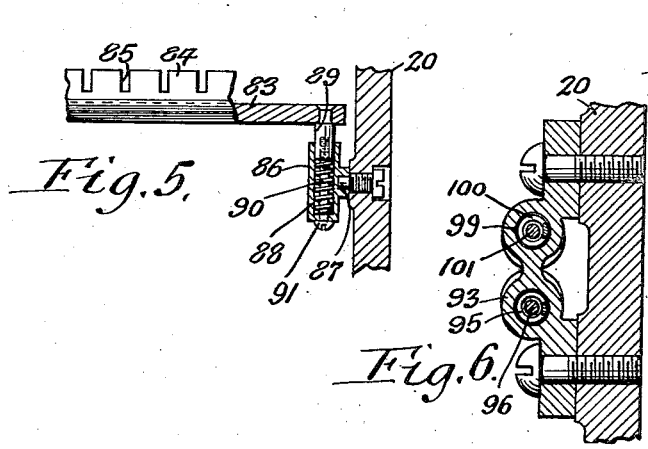

Oct. 16, 1934.  L. A. SHORT  1,976,751
MEAT TENDERER
Filed Dec. 16, 1932   4 Sheets-Sheet 3
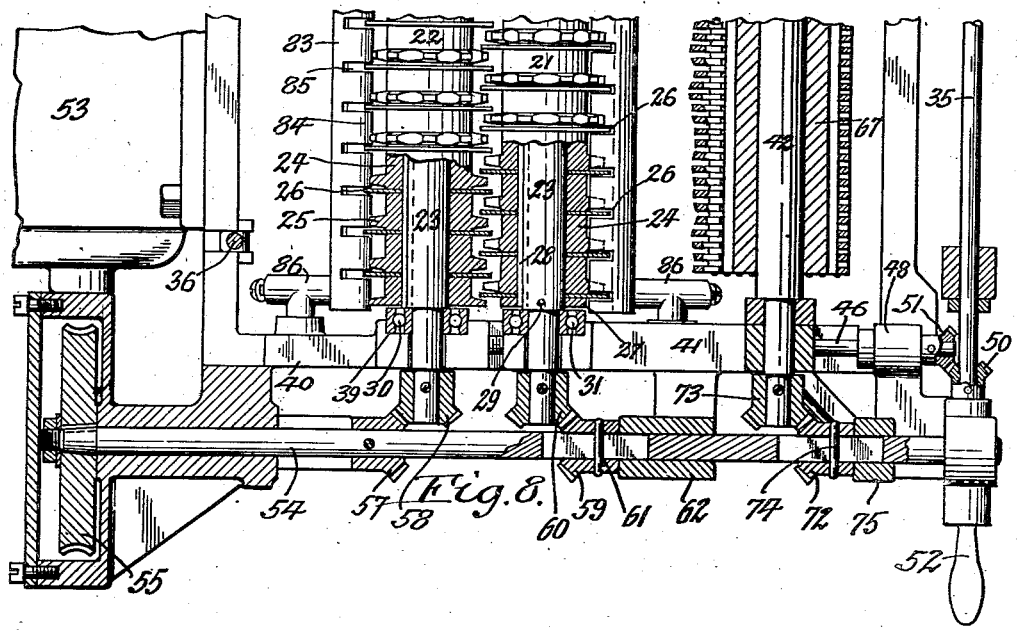
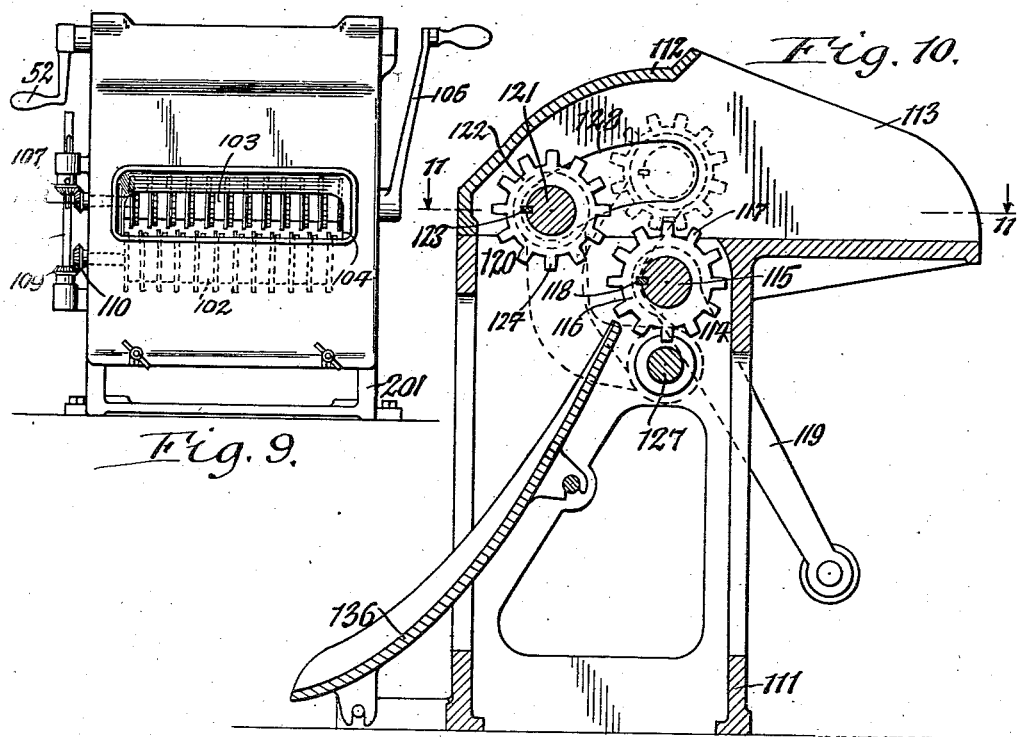
INVENTOR
Lillie A. Short
BY Popp & Powers
ATTORNEYS.

Oct. 16, 1934.   L. A. SHORT   1,976,751
MEAT TENDERER
Filed Dec. 16, 1932   4 Sheets-Sheet 4
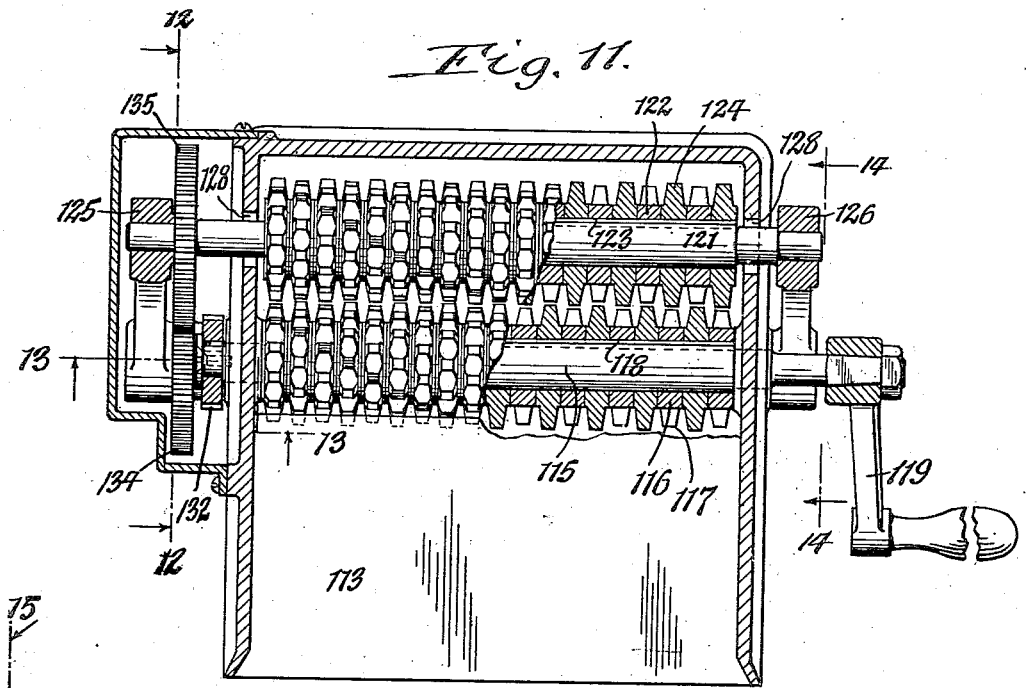
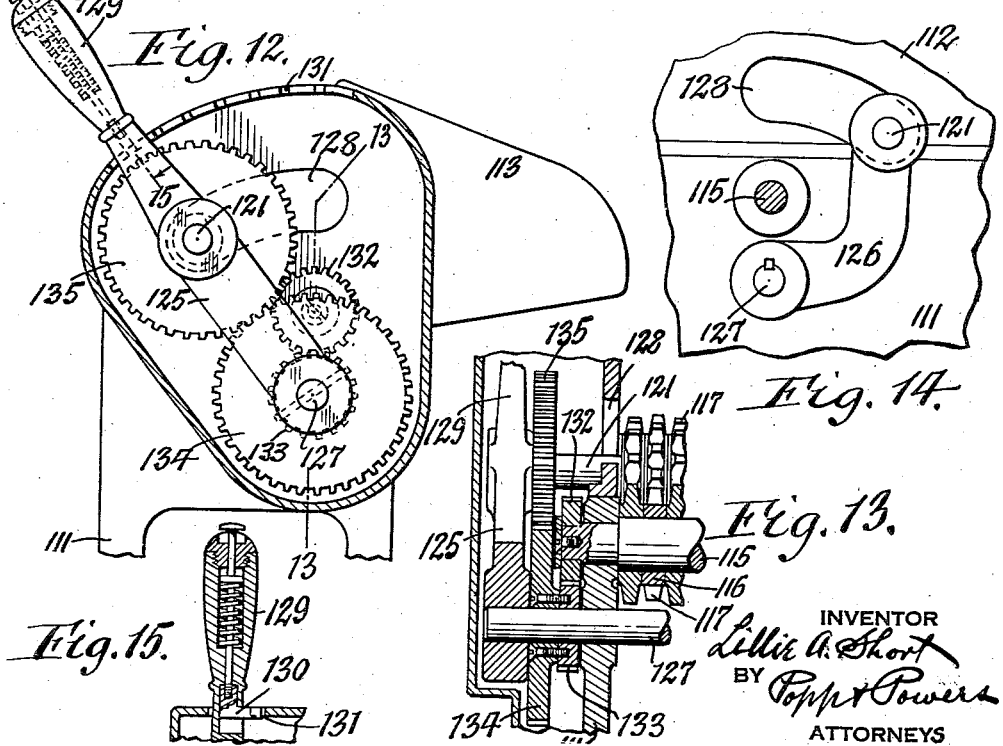
INVENTOR
Lillie A. Short
BY Popp & Powers
ATTORNEYS Patented Oct. 16, 1934

1,976,751

UNITED STATES PATENT OFFICE 1,976,751

MEAT-TENDERER

Lillie A. Short, Buffalo, N. Y.

Application December 16, 1932, Serial No. 647,558

7 Claims. (Cl. 17—26)

This invention relates to a meat tenderer of the general class shown in Letters Patent of the United States No. 996,891 dated July 4, 1911, and No. 1,452,093 dated April 17, 1923, in which the meat to be tendered is passed between two rotating tendering rolls which are provided with peripheral teeth adapted to engage with opposite sides of the meat for the purpose of tearing, severing or stretching the tissues thereof and permitting not only of more thoroughly cooking the same but also enabling the same to be masticated more easily.

One of the objects of this invention is to provide an improved form of tendering roll which will not only tear or stretch the tissues of the meat but also partly cut the same at a plurality of places so that the same can be more readily cooked and masticated.

Another object of this invention is to so mount the tendering rolls that the same can be quickly and conveniently adjusted relatively to each other for the purpose of varying the space between the rolls and thereby adapting the same to slices of meat of varying thickness to suit different requirements.

A further object of this invention is to provide simple and efficient means whereby the slice of meat to be tendered may be fed into the space between the tendering rolls without liability of choking the same and also without danger of injuring the hands of the attendant.

A further object of this invention is to provide improved means for scraping the fragments of meat from the tendering rolls and keeping the latter in a good working condition, both when turning these rolls forwardly or backwardly.

Another object of this invention is to improve the machine in several details of construction so as to reduce the cost of the same, permit of convenient operation and cleaning of its various parts, and also to so organize the several elements that they are not liable to get out of order.

In the accompanying drawings:

Figure 3 is a similar view taken on line 3—3 Fig. 1.

Figure 4 is a fragmentary side elevation of the machine taken from the side opposite to that shown in Fig. 2.

Figure 5 is a fragmentary horizontal section, taken on line 5—5 Fig. 2.

Figure 6 is a fragmentary horizontal section, on an enlarged scale, taken on line 6—6 Fig. 2.

Figure 7 is a fragmentary vertical section, taken on line 7—7 Fig. 2.

Figure 8 is a fragmentary horizontal section taken on line 8—8 Fig. 4.

Figure 9 is a front elevation showing a modified form of my invention in which the tendering rolls are arranged on a vertical line one above the other, as distinguished from the construction shown in Figs. 1, 2 and 8 in which the tendering rolls are arranged horizontally side by side.

Figure 10 is a vertical longitudinal section showing a modification of my invention in which one of the tendering rolls is moved in an arc relative to the other tendering roll for the purpose of adjusting the spacing between the two rolls for adapting the same to different thickness of slices of meat or producing varying degrees of tendering effects on the same.

Figure 11 is a horizontal section, taken on line 11—11 Fig. 10.

Figure 12 is a vertical section, taken on line 12—12 Fig. 11.

Figure 13 is a fragmentary vertical section, taken on line 13—13 Fig. 12.

Figure 14 is a fragmentary vertical section taken on line 14—14 Fig. 11.

Figure 15 is a fragmentary section taken on line 15—15 Fig. 12.

Similar characters of reference indicate like parts in the several figures of the drawings:

Referring to the construction shown in Figs. 1-8, the numeral 20 represents the main frame of the machine which may be of any suitable construction to support the several working parts of the machine.

Arranged on the upper part of this frame are two tendering rolls 21, 22 which in the present construction have their axes arranged parallel and horizontal and transversely with reference to the length of the machine, and adapted to receive the meat to be tendered in the vertical gap or passage between these rolls so that the opposing faces of the latter can operate upon opposite sides of the slice of meat, for the purpose of severing, tearing and stretching the tissues of the same.

Figure 1:
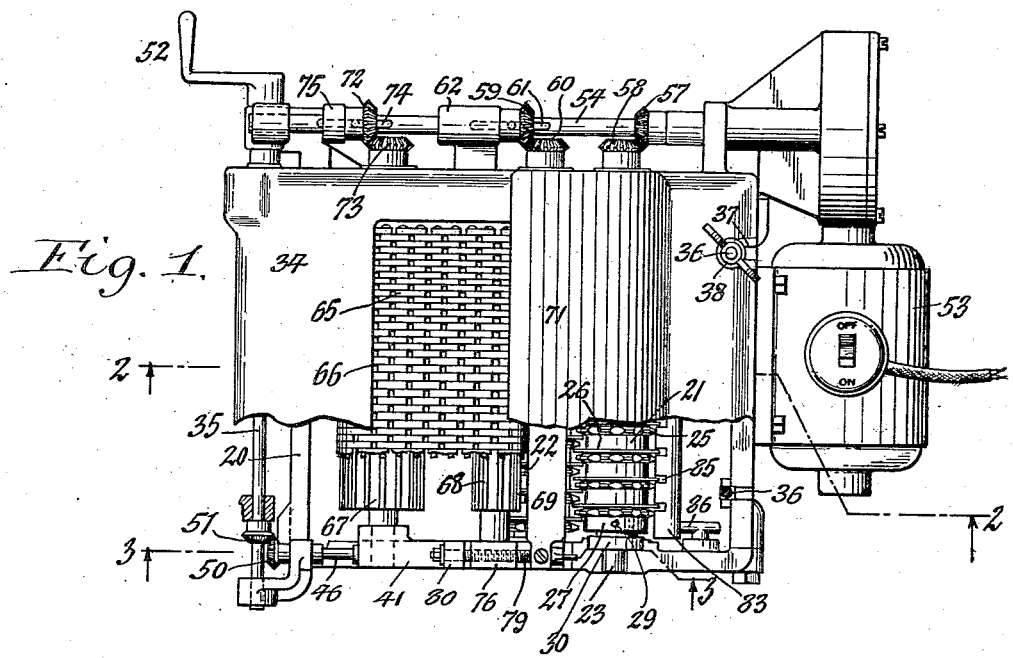
Figure 1 is a top plan view, on a reduced scale, of a meat tendering machine embodying one form of my invention, a portion of the top cover being broken away for the purpose of disclosing the working parts underneath the same.
Figure 2:
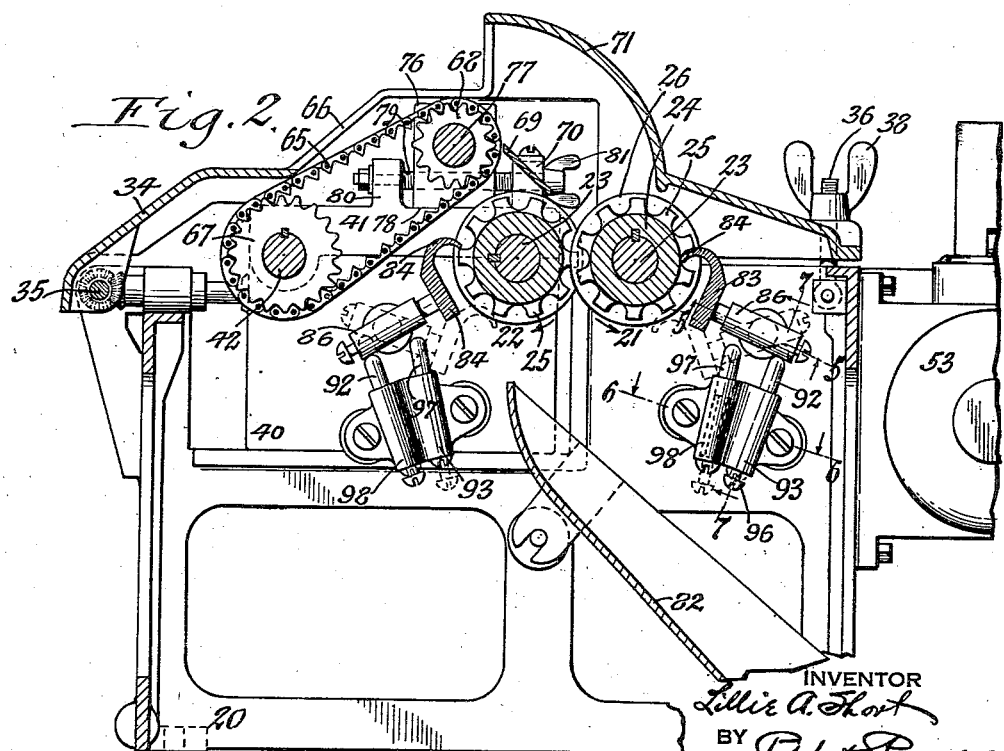
Figure 2 is a vertical longitudinal section, on an enlarged scale, taken on line 2—2 Fig. 1.

Although these rolls may be variously constructed the improved form of each of these rolls, as best shown in Figs. 1, 2 and 8, is constructed as follows:

The numeral 23 represents the central or supporting shaft of each tendering roll which is pivotally supported at its opposite ends in suitable bearings, as will presently appear. Upon this shaft is mounted a longitudinal row of hubs or sleeves 24 each of which is provided adjacent to one end thereof with an annular row of tendering teeth 25. The numeral 26 represents a plurality of cutting disks which are mounted on the shaft 23 and alternate with the hubs 24 so that each of the intermediate cutting disks is engaged on its opposite sides by two opposing hubs 24 while each of the cutting disks at the extreme end of the tendering roll is engaged on its inner side by the adjacent endmost hub 24 and at its outer side by a retaining collar 27.

The several toothed hubs 24, cutting disks 26 and end collars 27 are connected with the respective shaft by means of a key 28 so as to be compelled to turn therewith, and endwise displacement of these members on this shaft is prevented by means of a pin 29 passing through each of the collars 27 and the adjacent part of this shaft.

In assembling two tendering rolls of this character each cutter disk and the annular row of teeth on the adjacent hub 24 are arranged opposite the annular space between one of the cutting disks and an annular row of teeth on the other tendering roll, as shown in Figs. 2 and 8, whereby the meat which is passed through the space between these tendering rolls is engaged on its opposite sides along lines which are staggered relatively to each other and thereby cause the tendering teeth and cutting disks to merely tear or stretch and partly cut the tissues of the meat, without however passing entirely through the slice of meat, and thus leave the same in the best condition for subsequently cooking the same preparatory to being served and eaten.

These two rolls are so mounted on the main frame that they are capable of adjustment relatively to one another in order to vary the width of the gap or passage between these rolls and thereby to adapt the machine to different thickness of meat slices which are to be tendered and also enable the tendering rolls to form indentations or incisions of different depths in the meat to suit different tastes and kinds of cooking. In order to accomplish this purpose the shaft of one of these rolls in the present case is journaled at its opposite ends in fixed bearings 30 which are preferably of the ball type, while the other tendering roll has its shaft journaled at its opposite ends in bearings 31 of the ball type, which last-mentioned bearings are mounted on the main frame so as to be capable of adjustment toward and from the fixed bearings 30.

Each of the fixed bearings 30 is removably secured to the main frame by engaging its underside with a seat 32 in the upper part of the main frame, while the upper part of this bearing is engaged by a clamping jaw 33 forming part of the cover 34 of the main frame. This cover extends over the top of the main frame and has one of its ends pivotally connected with the main frame by means of a hinge, of which the horizontal transverse shaft 35 forms the pintle while the opposite end of this cover is detachably connected with the corresponding end of the main frame by means of two hinge bolts 36, each of which is pivoted at its lower end on the main frame, and has its upper part arranged within a notch 37 on the cover and secured to the latter by means of a wing nut 38, as best shown in Figs. 1, 2, 3.

Each of the bearings 31 of the adjustable tendering roll is seated with its underside in a socket 39 on the upper side of a slide 40 and is secured to the latter by a clamping bar 41, one end of which has a jaw 331 engaging with the upper side of the respective ball bearing 31, as shown in Fig. 4, while the opposite end thereof is pivotally connected with the slide 40 by means of a hinge, of which the horizontal transverse shaft 42 forms a part. This clamping bar 41 is held in its lowered operative position by means of the cover 34, which latter has a shoulder or lug 43 on its underside which engages with the upper side of this clamping bar 41, as best shown in Fig. 3.

Upon moving the two slides 40 horizontally and lengthwise of the main frame the adjustable tendering roll carried thereon is moved more or less toward and from the relatively fixed tendering roll, thereby enabling the vigorousness of the tendering operation of these rolls upon the meat and also the depth of the incisions or indentations thereon to be varied to suit different requirements or desires. Each of the slides 40 is guided for this purpose on the main frame by providing the lower end of the respective slide with a horizontal slide surface 44 which engages with a corresponding guide surface 45 on the adjacent part of the main frame, as best shown in Fig. 3, and horizontal longitudinal movement of each of these slides is preferably accomplished by means of a horizontal longitudinal adjusting screw 46 which has threaded engagement with the respective slide 40 and is journaled on the main frame so as to be capable of rotation thereon, but incapable of longitudinal movement relatively thereto. This is preferably accomplished, as best shown in Fig. 3, by journaling the inner end of the screw shaft 46 in a bearing 47 on the main frame, while the outer end of this screw shaft is journaled in a bearing 48 on the main frame and held against lengthwise movement by means of a collar 49 arranged on this screw shaft and engaging the inner side of the bearing 48, and a bevelled gear wheel 50 secured to this screw shaft and engaging with the outer side of the bearing 48. This last-mentioned gear forms part of the means whereby the two screw shafts 46 are simultaneously operated for causing the two slides 48 to move in unison and maintain the adjustable tendering roll in parallelism with the relatively fixed tendering roll.

This adjusting device in its preferred construction consists of the shaft 35 which forms the pintle of the hinge whereby the cover is pivotally connected with the main frame, and is also provided with bevelled gear wheels 51 which engage respectively with the bevelled gear wheels 50, and one end of this shaft 35 is provided with a handle or crank 52 whereby the shaft 35 may be turned in one direction or the other for causing the screw shafts 46 to actuate the slides 40 and thereby move the adjustable tendering roll into the proper position relative to the fixed tendering roll as desired.

Various means may be employed for rotating the tendering rolls either forwardly or backwardly by power or manual means. In the drawings the power for operating the machine is derived from an electric motor 53 which is mounted on the main frame and from which power is transmitted to the two tendering rolls by means of a longitudinal intermediate shaft 54 journaled in suitable bearings on the main frame and provided at one end with a worm wheel 55 which is engaged by a worm 56 on the driving shaft of the motor, a pair of intermeshing gear wheels 57, 58 secured respectively to the intermediate shaft 54 and the adjacent shaft 23 of the fixed roll 20, and a pair of intermeshing bevel gear wheels 59, 60 mounted respectively on the intermediate shaft 54 and the adjacent end of the shaft of the adjustable tendering roll. The bevelled gear wheel 59 is mounted by means of a spline 61 on the intermediate shaft 54 and is confined between the bevel gear wheel 60 and a bearing 62 on the adjacent slide 40 so that the bevel gear wheel 59 is compelled to turn with the intermediate shaft 54 and also compelled to move with the adjacent slide 40 and thereby maintain the driving connection between the shaft 54 and the adjustable tendering roll in all positions into which the latter may be shifted relative to its companion fixed tendering roll.

In order to enable the operator to determine the width of the gap or passageway between the two tendering rolls without opening the machine and thereby enable the adjustment to be effected without stopping the machine, indicating means are provided on the exterior of the machine which preferably consist of a mark 63 arranged on the upper edge of one of the slides 40 and traversing a horizontal longitudinal scale 64 arranged on the adjacent part of the cover 34, as shown in Fig. 4.

Means are provided for feeding the meat slice which is to be tendered laterally and then downwardly to the space between the tendering rolls for the purpose of preventing the meat from lodging in a mass between these rolls and clogging the same, and also to prevent possible injury to the hands of the operator who is supplying the meat to the machine. In its preferred construction the mechanism for accomplishing this purpose operates automatically and is constructed as follows:—

The numeral 65 represents an endless apron or belt which has its upper stretch arranged below an opening 66 in the cover 34 of the machine and which passes with its depressed front turn or receiving end around a receiving roller 67, while its upper elevated delivery turn passes around a delivery roller 68. This apron 65 and the receiving and delivery rollers 67 and 68 are preferably of sprocket construction, as shown in Fig. 2, so that a positive driving connection between the same is maintained. The lower receiving roller 67 is arranged in front of the adjustable tendering roll 22 and the delivery roller 68 is arranged above the adjustable roll 22 and slightly in front of the latter so that any meat passing through the opening 66 in the cover and deposited upon the upper stretch of the feed belt or apron will be moved upwardly and then discharged downwardly from the elevated or delivery turn of the feed belt or apron to the passage between the tendering rolls. The meat is directed from the delivery turn of the feeding apron to the gap between the tendering rolls by means of an inclined guide 69 which is mounted at its opposite ends on upwardly projecting lugs 70 on the slides 40.

In order to prevent the operator from injuring his fingers by manipulating the meat and pushing the same downwardly between the tendering rolls, a guard 71 is formed on the central part of the cover 34, which guard extends from a point above the fixed tendering roll upwardly and forwardly so as to overhang the adjustable tendering roll and the delivery turn of the feed apron or belt, as best shown in Figs. 1 and 2. By this means the operator is prevented from accidentally getting his fingers between the tendering rolls in attempting to manipulate the meat which is being tendered and thereby from sustaining possible injury.

The lower front or receiving roller 67 of the feeding belt is secured to the transverse shaft 42 which forms the pintle of the hinge whereby the upper or clamping bars 41 are hingedly connected with the slides 40, and a driving connection between this shaft 42 and the intermediate shaft 54 is obtained by means of cooperating bevel gear wheels 72, 73 mounted respectively on the intermediate shaft 54 and the adjacent end of the shaft 42.

The gear wheel 72 is connected by means of a spline 74 with the intermediate shaft 54 and is also confined between the gear wheel 73 and a bearing 75 which is mounted on the adjacent slide 40, as shown in Figs. 1 and 8, thereby compelling the bevel gear wheel 72 to turn with the shaft 54 but slide thereon, and also compelling this gear wheel to move lengthwise of the machine with the slides 40 so as to maintain a driving connection between the shaft 54 and the feed apron or belt, regardless of the position into which this apron may be adjusted, together with the adjustable tendering roll relative to the fixed tendering roll.

The bearings of the shaft 42 which carry the receiving roll 67 of the feeding apron are fixed relatively to the bearings or blocks 76 in which the opposite ends of the shaft 77 of the delivery roll 68 of the feed belt are journaled. These last-mentioned bearings 76 are capable of longitudinal adjustment on the slides 40 for the purpose of taking out any slack in the feed apron either when originally assembling the machine or for the purpose of compensating for wear. For this purpose each of the adjustable bearings 76 has sliding engagement at its lower end with a guide surface 78 on the adjacent part of the respective clamping bar 41, and this bearing 76 is moved lengthwise of the machine by means of a screw shaft 79 having threaded engagement with the bearing 76 and also journaled at one end in the adjacent supporting lug 70 and at its opposite end in another lug 80 which rises from the adjacent part of the clamping bar 41 so that this screw is only capable of turning but incapable of longitudinal movement on the bar 41. It follows from this that when each of these adjusting screws 79 is turned by means of the wings 81 arranged at one end thereof, or by any other suitable means, the upper or delivery feed roller 68 will be shifted lengthwise and the feed apron will be either tightened or loosened as desired. By mounting this feed belt tightening mechanism on the slides which carry the adjustable tendering roll, any adjustment of the latter relative to the fixed tendering roll will in no wise disturb the adjustment of the mechanism which adjusts the feed belt.

As the slice of meat which is being tendered passes downwardly through the space between the tendering rolls and issues from the underside thereof, this meat is received by a chute or pan 82 which is mounted on the main frame below the tendering rolls and operates to direct the finished piece of meat rearwardly from the machine into a position where it can be reached by the operator for subsequent cooking or use.

Means are provided whereby any particles or pieces of meat which are detached from the main body or slice are removed from the tendering rolls and thus prevented from adhering thereto and clogging the same. For this purpose a cleaning device is provided which cooperates with each of the tendering rolls, and in the preferred form of this cleaning device, as shown in Figs. 1, 2, 5, 6, 7, 8 the same is constructed as follows:—

The numeral 83 represents a cleaner bar arranged horizontally and transversely in the machine adjacent to the outer side of each of the tendering rolls and provided at its upper edge with inwardly and downwardly projecting clearing or scraping teeth 84, each of which is separated from an adjacent clearing tooth by means of a notch 85, which latter is adapted to receive the adjacent edge portion of one of the cutting disks while the clearing tooth itself is adapted to trip over the successive tendering teeth in the adjacent annular row and engage not only with the spaces between these teeth but also with the periphery of the hub 24 thereof so as to remove any particles of meat from these teeth and the hub thereof which may adhere thereto during the use of the machine and discharge such particles downwardly into the lower part of the machine.

Each of the cleaner or scraper bars 83 is yieldingly held with its teeth in engagement with the teeth and hubs of the respective tendering roll by the following means:—

The numeral 86 represents two brackets pivoted by means of trunnions 87 on adjacent supports so as to be capable of swinging in a verticle plane, and each of these brackets 86 is provided with a guideway 88 which receives a plunger 89 on one end of the scraper bar 83, as shown in Fig. 5. Within the guideway 88 is arranged a spring 90 which bears at one end against the bottom of this guideway and at its other end against the inner end of the plunger 89, thereby yieldingly pressing the scraper bar outwardly and holding its teeth 84 in engagement with the tendering teeth and hubs of the respective tendering roll. Complete detachment of the scraper bar 83 from the bracket 86 is prevented by means of a stop screw 91 which is arranged lengthwise in the bracket 86 and bears with its head against the outer end of the bracket, while its inner end is secured to the plunger 89.

In the normal operation of the machine the tendering rolls move in the direction of the arrows associated therewith, as indicated in Fig. 2 so that the meat which is being treated passes downwardly through the gap between the same. While the machine is operating in this manner the teeth of each of the scraper bars engages with the toothed hubs of the respective tendering roll at a point substantially horizontal in line with the axis of the respective roll. These teeth are yieldingly held in this position by spring tension means which preferably consist of two retaining plungers 92, each of which presses upwardly against the underside of one of the brackets 86 at a point outwardly beyond the axis of this bracket, as shown in Fig. 2, a guide bracket 93 secured to an adjacent support and having a guideway 94 for the respective plunger 92, a spring 95 arranged in this guideway and bearing at its opposite ends against the bottom of this guideway and the inner end of the plunger 92, and a stop screw 96 arranged within this bracket 93 and secured at its inner end to the plunger 92, while the head at its outer end is adapted to engage with the outer side of the bracket 93 for the purpose of limiting the expansion of the spring 95 and the projection of the plunger 92.

If at any time the tendering rolls are turned backwardly either in actual use of the machine when it is desired to reciprocate the slice of meat between the rolls and subject the same to repeated tendering operations, or when the machine is being operated while adjusting or inspecting the same, the scraping bars are permitted to adapt themselves to such reversal in the rotation of the tendering rolls and then are automatically restored to their operative position when the tendering rolls are again turned downwardly with their opposing surfaces so that normal operation of the machine is restored.

For this purpose two auxiliary plungers 97 are provided each of which is adapted to bear with its upper outer end against the bracket 86 at a point on its underside which is arranged inwardly from the axis of the bracket 86, a guide bracket 98 secured to an adjacent stationary part and provided with a guideway 99 which receives the plunger 97, a spring 100 arranged within the guideway 99 and bearing at its opposite ends against the bottom of the guideway 99 and against the inner end of the plunger 97, and a stop screw 101 arranged within the bracket 98 and secured at its inner end to the plunger 97, and having a head at its outer end which is adapted to bear against the outer side of the bracket 98 and limit the expansion of the spring 100 and the projection of the plunger 97.

The plunger 97 and the tensioning device associated therewith are identical with the plunger 92 and the tensioning device associated therewith, and the detailed construction of the plunger 92 and its spring mounting, as shown in Fig. 7, will therefore serve to illustrate the corresponding parts of the plunger 97 and its tensioning device.

The pivots 87 and brackets 93 and 98 of the tensioning devices which yieldingly control the scraper bar or blade 83 associated with the relatively stationary tendering roll 21 at the right hand side of Fig. 2 are mounted on the adjacent stationary side portions of the main frame while the corresponding pivots 87 and brackets 93 and 98 of the tensioning devices which yieldingly maintain the scraper bar 84 in operative relation to the tendering roll 22 at the left hand side of the machine in Fig. 2, are mounted on the slides 40, thereby always maintaining each of these scraping devices in its proper position relative to the respective tendering roll.

Upon turning the tendering rolls 21, 22 in a direction reverse to that indicated by the arrows associated with these rolls, both of the scraper bars will be shifted by the teeth of these rolls from the position shown by full lines in Fig. 2 to the position shown by dotted lines in the same figure. While the scraper bars are shifted into this lowered position the swivel brackets 86 will be turned downwardly at their inner ends and by engaging the upper ends of the plungers 97, will depress the latter and compress the springs 95 associated therewith so that the scrapers at this time are yieldingly held in engagement with the tendering rolls. As soon, however, as the tendering rolls again resume their normal action during which they move downwardly on their opposing sides, then the tension of the springs 100 will cause the plungers 97 to press the scraper bars against the tendering rolls so that the latter will again lift the scrapers from their lower inoperative position shown by dotted lines in Fig. 2 to their upper operative position shown by full lines in this same figure.

By this means the scraper bars will always be maintained in operative relation to the tendering rolls and injury to the same will be prevented regardless of whether the tendering rolls are moving downwardly or upwardly with their opposing sides.

Instead of arranging the tendering rolls horizontally side by side, as shown in Figs. 1 and 8, these rollers, as shown at 102 and 103 may be arranged one above the other in the main frame 201 of the tendering machine, which in effect is the equivalent of turning the machine shown in Fig. 2 one-quarter in the vertical plane so that the left-hand end thereof would form the bottom, the right hand end thereof the top, and the tendering rollers would be fed through an opening 104 in one side of the main frame, as shown in Fig. 9.

The construction of the tendering rolls and the mechanism for adjusting the same one toward the other, and the means for keeping the tendering rolls free from small pieces of meat, would however be substantially like that shown and described with reference to the construction shown in Figs. 1–8.

Instead of driving the tendering rolls by motor the same are operated in the construction shown in Fig. 9 by applying a crank 105 to one end of the upper roll and motion is transmitted from this upper tendering roll 103 to the lower roll 102 so that they rotate in unison by means of an upright intermediate shaft 106 which is operatively connected with the upper tendering roll by means of intermeshing bevel gear wheels 107, 108 secured respectively to the intermediate shaft 106 and the upper tendering roll 103, and a pair of intermeshing bevel gear wheels 109, 110 connected respectively with the intermediate shaft 106 and the lower tendering roll 102.

The modified form of the meat tendering machine shown in Figs. 11–15 and embodying certain features of my invention, is constructed as follows:

The numeral 111 represents the main frame of the machine which supports the several working parts and is provided at its upper end with a hood or cover 112 which has an inlet passage 113 at one end thereof through which the meat to be tendered is introduced into the machine. At the inner end of this feed passage and adjacent to the lower side thereof is arranged a lower tendering roll 114 which preferably consists of a horizontal transverse driving shaft 115 which is journaled at its opposite ends in suitable bearings on the main frame, and a plurality of toothed wheels which are arranged side by side in a longitudinal row on the shaft, each of these wheels consisting of a hub 116 and an annular row of teeth 117 arranged on the periphery of this hub. The toothed wheels of this shaft are compelled to turn therewith by means of a spline 118 and the turning of the shaft is effected by any suitable means, e. g. by means of a handle or crank 119 secured to one end thereof which extends outside the main frame. With this lower tendering roll another tendering roll 120 is adapted to cooperate for tendering meat which is passed between the same. This other tendering roll is constructed substantially like the lower tendering roll 114 and comprises a horizontal transverse shaft 121 and a plurality of toothed wheels which are arranged side by side lengthwise on the shaft, and each provided with a hub 122 which is secured to the shaft 121 by means of a key 123 and an annular row of teeth 124 arranged on the periphery of each of these hubs.

The teeth of each of these tendering rolls 114 and 120 are so disposed that each tooth of one tendering wheel is arranged in line with the space between two teeth on the adjacent toothed tendering wheel, as shown in Fig. 11, whereby the several teeth of each tendering roll form spiral lines of teeth, as indicated by those teeth on these two rows which are shaded at their outer ends or faces in Fig. 11. The teeth of each tendering wheel on one of these rolls are arranged transversely in line with the teeth of the other roll, and each tooth of one tendering wheel on one of the rolls is arranged opposite the space between two teeth of a tendering wheel on the other roll. By this means the piece of meat which is inserted between the two tendering rolls is always engaged by the several teeth of the two rolls in staggered relation and at no time is the same section of the meat engaged on its opposite sides by teeth of both rolls being arranged end to end, thereby avoiding any crushing or squeezing action upon the meat and instead subjecting the same only to an indenting and tearing action.

The upper tendering roll 120 has its shaft 121 journaled at its opposite ends in vertically swinging arms 125, 126 which are arranged outside of the main frame and pivoted at their lower ends by means of a transverse horizontal shaft 127 on the main frame at a point eccentric to and preferably below the axis of the shaft 115 of the lower tendering roll. It follows from this that when the arms 125, 126 are swung rearwardly the upper tendering roll 120 will be separated a considerable distance from the lower tendering roll 114, as shown by full lines in Fig. 10, while upon swinging these arms forwardly the upper tendering roll 120 will be moved upwardly and forwardly into a position over the lower tendering roll and closer thereto, as shown by dotted lines in Fig. 10. It is therefore possible by this manner of mounting the upper tendering roll to adjust the latter relative to the lower tendering roll for varying the space or gap between the same to suit the thickness of the slice of meat which is to be tendered, or to increase or decrease the intensity of the tendering operation of the tendering rolls on the particular piece of meat which is under treatment.

In order to permit the shaft 121 to reach the outside of the main frame the latter are provided with curved slots 128 for the passage of the ends of this shaft. Means are provided for shifting and holding the upper tendering roll in various adjusted positions relative to the lower tendering roll, which means in their preferred form consist of a handle 129 formed on the left hand rock arm 125 and provided with a latch 130 adapted to engage with one or another of a segmental row of notches 131 formed on a part of the main frame.

Motion is transmitted from the lower or driving shaft 115 of the lower tendering roll to the shaft 121 of the upper tendering roll by gearing which preferably consists of a driving pinion 132 secured to the lower driving shaft 115, an intermediate pinion 133 journaled loosely on the shaft 127 and meshing with the driving pinion 132, an intermediate gear wheel 134 turning loosely on the shaft 127 and connected with the intermediate pinion 133, and a driven gear wheel 135 connected with the shaft 121 of the upper tendering roll and meshing with the intermediate gear wheel 134, as shown in Figs. 11, 12, 13.

By this means the upper tendering roll may be adjusted into its various positions relative to the lower tendering roll without disturbing the driving connection between these rolls.

As the meat passes from the feed trough or passage 113 downwardly through the space between the upper and lower tendering rolls 114, 120 the same issues from the under side of these rolls and drops into a chute 136 which is mounted in an inclined position on the lower part of the main frame and directs the meat to the table, receptacle or other place provided for the same.

I claim as my invention:

1. A meat tenderer comprising a main frame, a pair of tendering rolls which are adapted to receive between them the meat to be tendered, stationary bearings on said frame for one of said tendering rolls, slides movable toward and from said stationary bearings and provided with adjustable bearings for the other tendering roll, a feed belt for carrying the meat to said rolls, a roller supporting one turn of said belt and journaled in fixed bearings on said slides, bearing blocks adjustably mounted on said slides, and a supporting roller for the other turn of said belt journaled on said blocks.

2. A meat tenderer comprising a main frame, a pair of tendering rolls which are adapted to receive between them the meat to be tendered, stationary bearings on said frame for one of said tendering rolls, slides movable toward and from said stationary bearings and provided with adjustable bearings for the other tendering roll, a feed belt for carrying the meat to said rolls, a roller supporting one turn of said belt and journaled in fixed bearings on said slides, bearing blocks adjustably mounted on said slides, a supporting roller for the other turn of said belt journaled on said blocks, and means for adjusting said blocks on said slides including screw shafts having threaded engagement with said blocks and journaled on said slides but held against lengthwise movement thereon.

3. A meat tenderer comprising a main frame, a pair of tendering rolls which are adapted to receive between them the meat to be tendered, fixed bearings on said frame for one of said rolls, slides movable on said frame toward and from the fixed bearings and provided with adjustable bearings for the other roll, a feed belt for carrying the meat to said rolls, supporting rollers mounted on said slides and receiving said belt, a driven shaft journaled on said frame, intermeshing gear wheels for transmitting motion from said driving shaft to the tendering roll which is journaled in fixed bearings, intermeshing gear wheels one connected with the adjustable tendering roll and the other splined on the driving shaft, and intermeshing gear wheels one connected with one of said supporting rollers and the other splined to the driving shaft.

4. A meat tenderer comprising a main frame, a pair of tendering rolls which are adapted to receive between them the meat to be tendered, a cover movably connected with the upper part of said frame and provided with an opening through which the meat to be tendered is passed to said rolls, fixed bearings for one of said rolls which are clamped between the frame and said cover, slides movable on said frame toward and from said fixed bearings, clamping bars pivoted by a pintle shaft to said slides, adjustable bearings clamped between said slides and clamping bars, a feeding belt for carrying the meat to be tendered to said rolls, a roller supporting one turn of said belt and mounted on said pintle shaft, and another roller supporting the other turn of said belt and journaled in bearings on said slides.

5. A meat tenderer comprising a tendering roll adapted to engage the meat to be tendered and having peripheral teeth, and means for removing particles of meat from said roll and its teeth including a scraper bar engaging said teeth, and spring projecting means for holding said scraper bar yieldingly in engagement with said teeth and roll, and comprising plungers connected with said bars, brackets pivotally mounted on a fixed support and receiving said plungers, and springs mounted on said brackets and projecting said plungers.

6. A meat tenderer comprising a tendering roll adapted to engage the meat to be tendered and having peripheral teeth, and means for removing particles of meat from said roll and its teeth including a scraper bar engaging said teeth, and spring projecting means for holding said scraper bar yieldingly in engagement with said teeth and roll, and comprising plungers connected with said bars, brackets pivotally mounted on a fixed support and receiving said plunger, springs mounted on said brackets and projecting said plungers, and spring retaining means adapted to engage with each of said brackets on opposite sides of the pivot thereof and to hold the scraper bar in engagement with said roll.

7. A meat tenderer comprising a tendering roll adapted to engage the meat to be tendered and having peripheral teeth, and means for removing particles of meat from said roll and its teeth including a scraper bar engaging said teeth, and spring projecting means for holding said scraper bar yeldingly in engagement with said teeth and roll, and comprising plungers connected with said bars, brackets pivotally mounted on a fixed support and receiving said plunger, springs mounted on said brackets and projecting said plungers, and spring retaining means adapted to engage with each of said brackets on opposite sides of the pivot thereof and to hold the scraper bar in engagement with said roll, said spring retaining means including two retaining plungers adapted to engage with each of said brackets on opposite sides of the pivot thereof, stationary guides for said retaining plungers, and springs for projecting said retaining plungers.

LILLIE A. SHORT.